DIGITAL ADDING AND SUBTRACTING DEVICE

Filed April 13, 1965

INVENTOR
Akira Kamoi
Masakazu Ejiri
BY
H. Edward Mestern

DIGITAL ADDING AND SUBTRACTING DEVICE

Filed April 13, 1965

INVENTOR
Akira Kamoi
Masakazu Ejiri
BY
H. Edward Mestern

INVENTOR
Akira Kamoi
Masakazu Ejiri
BY
H. Edward Mestern

INVENTOR
Akira Kamoi
Masakazu Ejiri
BY
H. Edward Mestern

INVENTOR
Akira Kamoi
BY Masakazu Ejiri
H. Edward Meslern

United States Patent Office 3,328,567

Patented June 27, 1967

3,328,567

DIGITAL ADDING AND SUBTRACTING DEVICE

Akira Kamoi and Masakazu Ejiri, Tokyo-to, Japan, assignors to Kabushiki Kaisha Hitachi Seisakusho, Tokyo-to Japan, a joint-stock company of Japan Filed Apr. 13, 1965, Ser. No. 447,622
Claims priority, application Japan, Apr. 15, 1964, 39/21,001
2 Claims. (Cl. 235—173)

Figure 1:
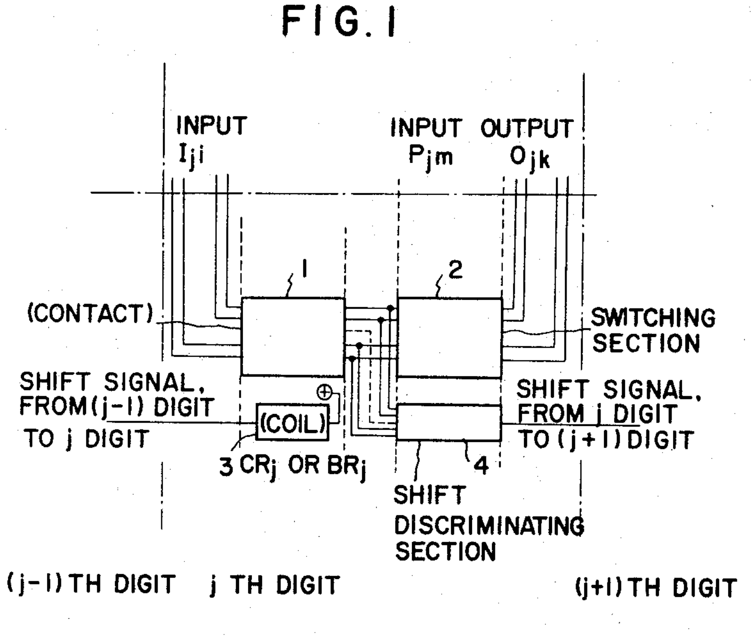

This invention relates to digital systems of the base-*n*, *n*-line type. More particularly, the invention concerns a new signal comparison system consisting of a digital system of the base-*n*, *n*-line type wherein, in accomplishing signal comparison such as, for example, addition (or subtraction), one of the signals to be compared, that is, the addend (or the subtrahend) is applied as mechanical angular position of a slider of a switch such as a rotary switch, and the sum (or difference) is obtained in the output.

According to the present invention, briefly stated, there is provided a signal comparison system comprising, for each digit, means to apply as a mechanical position one of the signals to be compared, means to compare said signal and an input signal and thereby to produce a comparison result, and means to control the signal comparison operation of the higher or lower digit in accordance with said comparison result.

Figure 5:
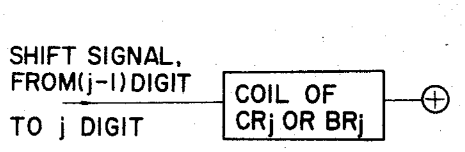
Figure 4:
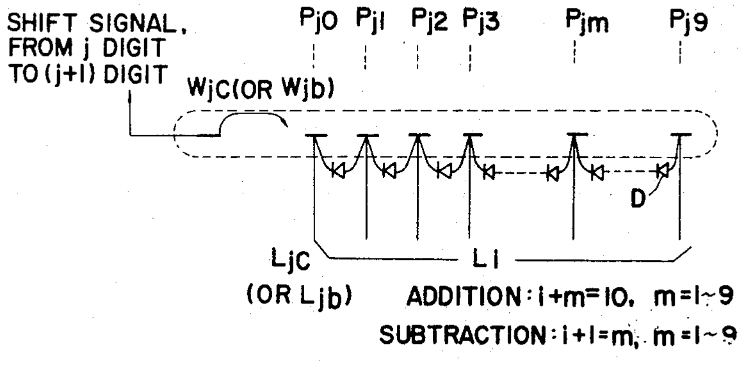
Figure 6A:
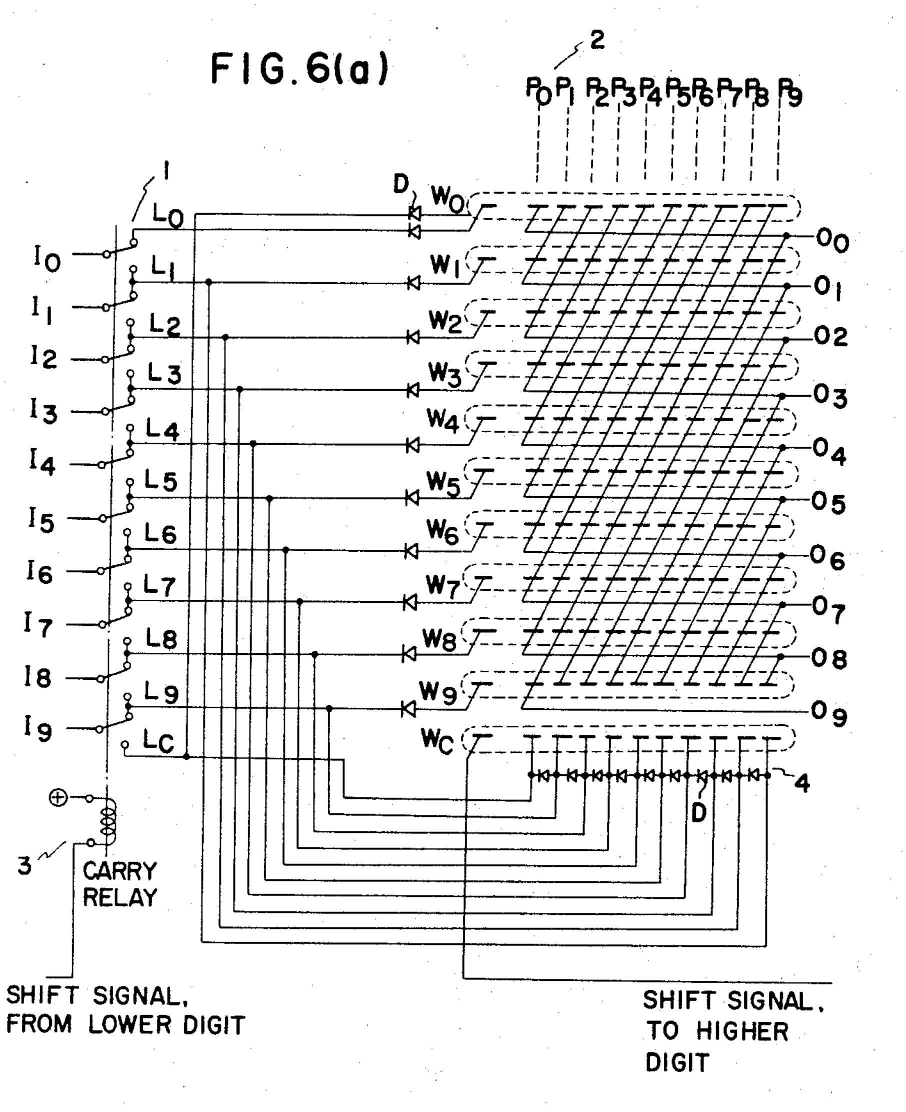
Figure 6B:
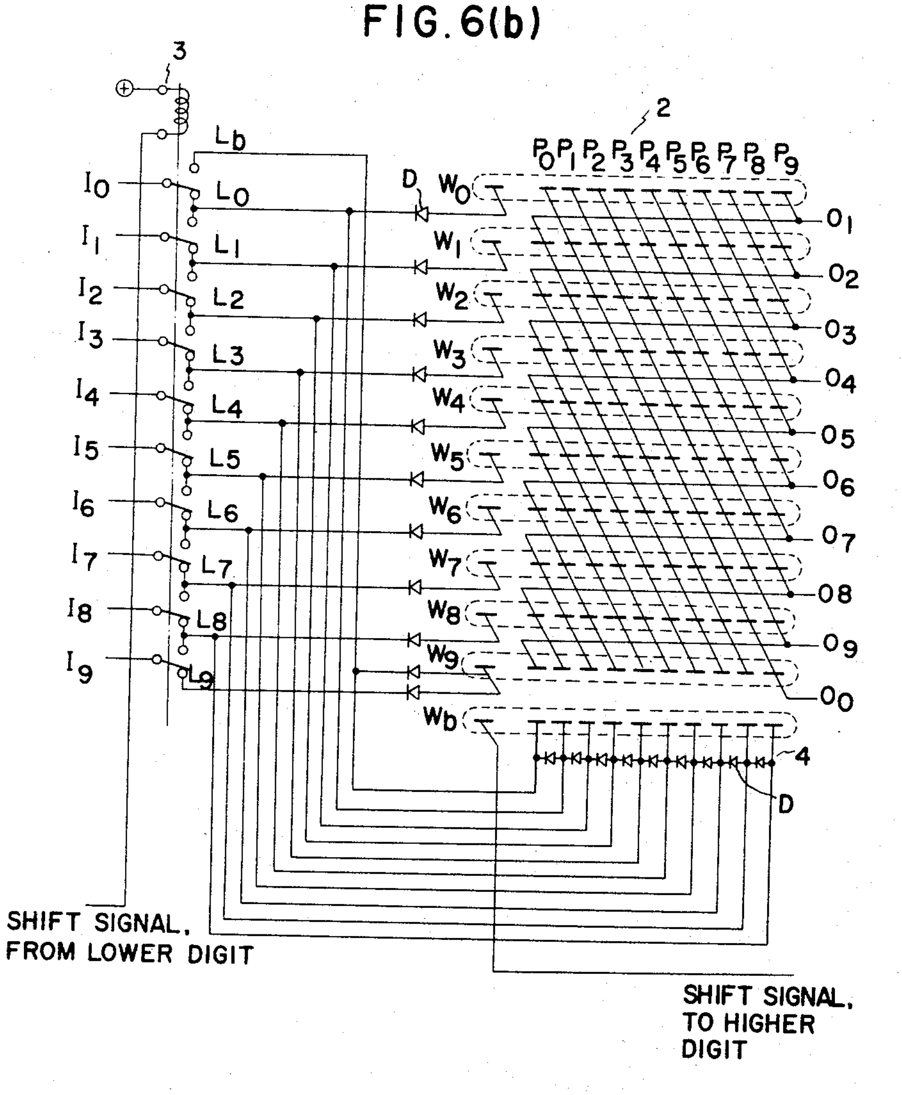

The nature, principle, and details of the invention will be more clearly apparent from the following detailed description of the principle and preferred embodiments of the invention, when taken in conjunction with the accompanying drawings in which like parts are designated by like reference characters, and in which:

FIG. 1 is a block diagram indicating the principle of the invention;

FIGS. 2, 3, 4, and 5 are explanatory diagrams for an explanation of the operational principle of the system according to the invention; and FIGS. 6(*a*), 6(*b*) and 7 are schematic diagrams showing examples of preferred embodiment of the invention.

For convenience in description, the following disclosure is presented with respect to the case of a decimal 10-line signal system.

Referring to FIG. 1, there is illustrated therein one example of composition and arrangement of parts for accomplishing addition or subtraction by means of a rotary switch at the *j*th digit of a decimal 10-line signal system. In the case of an input $I_{ji:i=0\sim 9}$, one of the 10 lines is transmitting a ground (earth) signal which, if denoted by $I_{ji}$, represents a decimal *j*-digit value *i*. The quantity $O_{jk:k=0\sim 9}$ on the right-hand side is the output, which is connected by way of a coil of a relay or an indicator lamp to a positive (+) power source (not shown).

The coil 3 of a shift-up relay 1 is excited by a shift-up signal produced from the decimal $(j-1)$ digit. At the same time, the relay 1, which has 10 transfer contacts, will herein be referred as a "carry relay" $CR_j$ at the time of addition and as a "borrow relay" $BR_j$ at the time of subtraction. Addend or subtrahend is applied to a rotary switch comprising a switching section 2 of 10 circuits and a shift-up discriminating section 4 of one circuit. Numerals are provided to correspond to the positions of the sliding member of this rotary switch, whereby the state of coincidence of the rotary switch at position $P_{jm}$ signifies that a numerical value *m* in the *j* digit is being applied as addend (or subtrahend).

Figure 2:
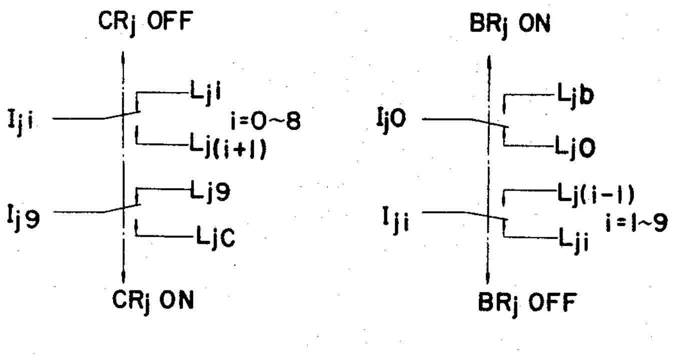

The operations of the various parts will now be considered in detail. First, the connections between contacts through the shift-up relay 1 are effected in the following manner. In the case of addition as indicated in FIG. 2 the connections are:

$$I_{ji}\rightarrow L_{ji:i=0\sim 9}$$

when $CR_j$ is "off," and $I_{ji}\rightarrow L_{j,\,i+1:i=0\sim 8}$, $I_{j9}\rightarrow L_{jc}$ when $CR_j$ is "on."

Since $L_{jc}$ imparts a signal to $L_{jo}$ and, at the same time, produces a shifting-up signal adapted to excite $CR_{j+1}$, it is distinguished from simply $L_{jc}$ and handled accordingly. In the case of subtraction, when $BR_j$ is "off," the connection is $I_{ji}\rightarrow L_{ji:i=0\sim 9}$, and when $BR_j$ is "on," the connection is $I_{ji}\rightarrow L_{ji-1:i=1\sim 9}$, $L_{jc}\rightarrow L_{jb}$. Since $L_{jb}$ sends a signal to $L_{j9}$ and, at the same time, produces a shift-up signal to excite $BR_{j+1}$, it is handled separately from $L_{j9}$.

Figure 3:
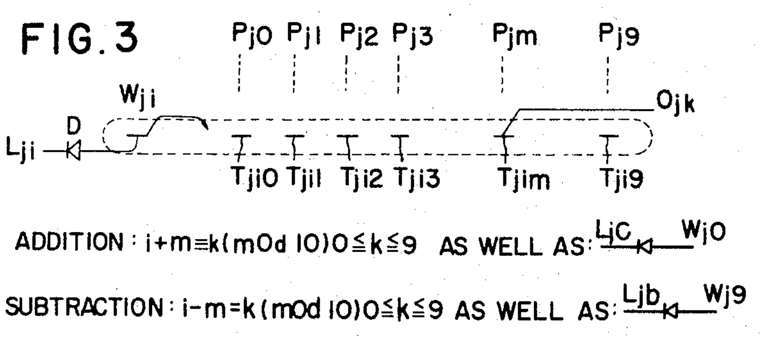

Next, with regard to the switching section 2 of the rotary switch, numbers $W_{ji}$ $(i=0\sim 9)$ are assigned to 10 sliding members. In the case of addition, a unidirectional circuit element D (for example, a diode) is inserted between $L_{jo}$ and $W_{jo}$, $L_{j1}$ and $W_{j1}$ . . . $L_{j9}$ and $W_{j9}$, and between $L_{jc}$ and $W_{jo}$, as indicated in FIG. 3, and connected so that current will flow from the W side to the L side. The terminal contacted by the sliding member $W_{ji}$ when the rotary switch is at the position $P_{jm}$ will be designated by $T_{jim}$, which is to be connected to output $O_{jk}$, where *k* is computed from the following equation.

$$i+m\equiv k,\ (\text{mod }10),\ 0\leq k\leq 9$$

In the case of a subtracting circuit, a unidirectional element D is inserted between $L_{jo}$ and $W_{jo}$, $L_{j1}$ and $W_{j1}$ . . . $L_{j9}$ and $W_{j9}$, and between $L_{jb}$ and $W_{j9}$, as indicated in FIG. 3, and connected so that current will flow from the W side to the L side. The terminal contacted by the sliding member $W_{ji}$ when the rotary switch is at the position $P_{jm}$ will be designated by $T_{jim}$, which is to be connected to output $O_{jk}$, where *k* is computed from the following equation.

$$i-m\equiv k,\ (\text{mod }10),\ 0\leq k\leq 9$$

Next, the shift-up discriminating circuit 4 of the rotary switch is of the following character. In the case of addition, if the sliding member of this circuit is designated by $W_{jo}$, $W_{jo}$ will be the point at which the shift-up signal is led out and is connected to one terminal of the coil of carry relay $CR_{j+1}$, and the other terminal of this coil is connected to the positive power source.

The terminal contacted by sliding member $W_{jc}$ will be designated by $T_{jcm}$ when the rotary switch is in the position $P_{jm}$. $T_{jco}$ is connected to $L_{jc}$. While $T_{jcm:m=1\sim 9}$ is connected to $L_{ji}$, the relationship between *i* and *m* is so determined that $i+m=10$ is satisfied. Between $T_{jci}$ and $T_{j,\,c,\,(i-1):i=1\sim 9}$, respective unidirectional elements are inserted and so connected that current will flow from the side of the larger number of the character *i* to the side of the smaller number.

In the case of subtraction, the sliding member of this circuit is designated by $W_{jb}$, whereupon $W_{jb}$ becomes the point at which the shift-up signal is led out and is connected to one terminal of the coil of borrow relay $BR_{j+1}$, and the other terminal of this coil is connected to the positive terminal of the power source.

The terminal contacted by sliding member $W_{jb}$ when the rotary switch is in the position $P_{jm}$ will be designated by $T_{jbm}$. $T_{jbc}$ is connected to $L_{jb}$. While $T_{jbm,\ m=1\sim 9}$ is connected to $L_{ji}$, the relationship between this *i* and *m* is so determined that $i+1=m$ is satisfied. Between $T_{jbi}$ and $T_{jb(i-1):1\sim 9}$, respective unidirectional elements are inserted and so connected that current will flow from the side of larger number of the character *i* to the side of smaller number. The connection of the shift-up signal to the carry relay or the borrow relay is indicated in FIG. 5.

FIG. 6(*a*) indicates one example for one digit position of an addition circuit arranged in the above described manner, and FIG. 6(*b*) indicates one example for one digit position of a subtraction circuit. The character *j* is omitted for the purpose of avoiding complication of the drawing. The addition and subtraction circuits formed from rotary switches and carry relays operate in the following manner.

First, it will be assumed that the input is applied at 3, and the rotary switch is placed to coincide with scale numeral 4 on the dial scale and that the carry relay is not energized. For the input, a ground (earth) signal is entering $I_3$, and this passes through $L_3$ and $W_3$ and, passing from the sliding member of $W_3$ through the terminal in contact (this terminal is $T_{j34}$ but is not designated in the drawing), is transmitted to $O_7$. Thus, the operation $3+4=7$ is accomplished. A shift-up signal is not sent out. When the sum of the input and the dial scale numeral of the rotary switch is 9 or less, and the carry relay is not energized, the operation in all cases is similar to that described above.

Next, the case when the input is 8, the rotary switch dial reading is 5, and the carry relay which is not energized will be considered. A ground (earth signal) is entering $I_8$ and, passing through $L_8$ and $W_8$ is transmitted to $O_3$. At the same time, a shift-up signal transmitted in series through diodes is sent out. Thus, the operations of $5+8\equiv3$ (mod 10) and shift-up output are accomplished.

The carry relay or the borrow relay is energized by the shift-up signal sent from the lower digit and modifies the connections between the contacts.

The carry relay operates in the following manner. When a shift-up signal is sent out in the $j-1$ digit, a signal $I_{ji(i=0\sim8)}$ passes through $L_{j(i+1)}$ and is transmitted to $W_{j(i+1)}$ in the *j*th digit. A signal $I_{j9}$ passes through $L_{j0}$ and is transmitted to $W_{j0}$. At the same time, since there is a diode as indicated in the drawing, the shift-up signal is further transmitted to the higher $(j+1)$ digit irrespective of the position of the sliding member of the rotary switch. This operation signifies that shifting-up is being accomplished. Thus, the present circuit fulfills all of the required conditions for addition.

The subtraction circuit operates in the following manner. First, it will be assumed that the input is applied at 5, and the rotary switch is placed in the position of dial scale numeral 2, and that the borrow relay is not energized. For the input $I_5$ a ground (earth) signal is being applied and, passing through $L_5$ and $W_5$, reaches $O_3$ by way of the terminal contacted respectively by the sliding members of $W_5$ (this terminal is $T_{j52}$ but is not designated in the drawing). Thus, the operation $5-2=3$ is accomplished. A shift-up signal is not sent out. When the input is greater than the dial scale numeral of the rotary switch, and the borrow relay is not energized, the operation in all cases is similar to that described above.

Next, the case when the input is 4, the rotary switch dial reading is 8, and the borrow relay is not energized will be considered. A ground (earth) signal is entering $I_4$ and, passing through $L_4$ and $W_4$, reaches $O_6$. At the same time, a shift-up signal transmitted in series through diodes is sent out. Thus, the operations of $4-8\equiv6$ (mod 10) and shift-up output are accomplished.

This borrow relay in this case operates in the following manner. When a shift-up signal is sent out in the $j-1$ digit, a signal $I_{ji(i=1\sim9)}$ is transmitted to $W_{j(i-1)}$ by way of $L_{j(i+1)}$ in the *j*th digit. A signal $I_{j0}$ is transmitted to $W_{j9}$ by way of $L_{jb}$. At the same time, since there is a diode as indicated in the drawing, the shift-up signal is further transmitted to the higher $(j+1)$ digit irrespective of the position of the sliding member of the rotary switch. This operation signifies that shifting-up operation for subtraction is being accomplished. Thus, the present circuit fulfills all of the required conditions for subtraction.

While the above description relates to features of one digit, in the case of a large number of digits, $I_{ji}$ is directly connected to $L_{ji}$ in the lowest digit, and a shift-up relay is unnecessary, and the wiring of $L_{jc}$ or $L_{jb}$ is also unnecessary. Furthermore, modified applications such as using the shift-up signal sent out from the highest digit for an overflow signal at the time of addition and for an underflow signal at the time of subtraction may be freely resorted to.

By the system of the present invention as described above, it is readily possible to provide extremely simple circuits such as addition circuits by the use of means such as rotary switches to represent as a mechanical position one of the signals to be compared, unidirectional elements for eliminating interference between various circuits, if necessary, and relays for shifting. Moreover, even if a temporary power failure occurs, since the addend or subtrahend is given in terms of mechanical position, erroneous signals are not sent out after recovery from the power failure, whereby the system according to the invention is most suitable for devices such as devices for numerical positioning of machine tools.

While it is not necessary always to arrange $p_0\sim P_9$ in this numerical order, this order is convenient at the time of dial setting. Furthermore, while the above description relates to the use of a positive (+) power source, exactly, the same circuit arrangement can be used with a negative (−) power source provided that all unidirectional elements are reversed in direction.

Instead of a rotary switch, a switch of a construction whereby numerous sliding members can be simultaneously switched such as, for example, a slide switch, push-button switch, or a line switch, can be used.

Figure 7:
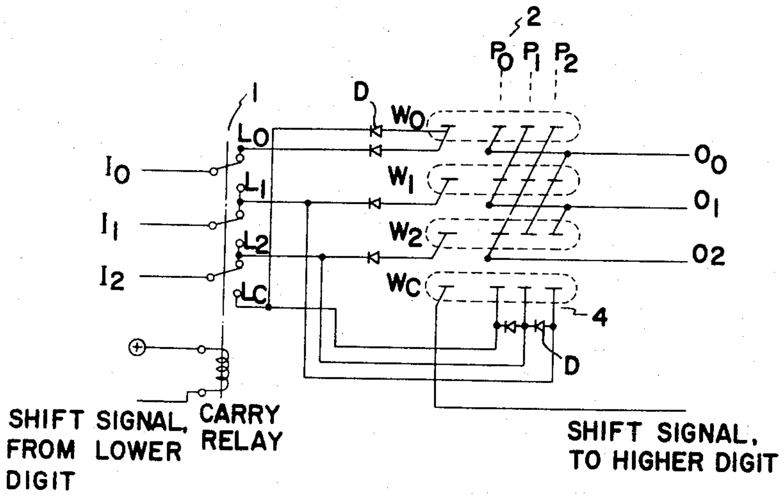

Furthermore, while the above examples are described with respect to a decimal 10-line system for the sake of convenience in description, the present invention is equally applicable to cases wherein the number *n* is another number. FIG. 7 shows an example of an addition circuit for signals of the base-3, 3-line type. In the case where $n=2$, it is also possible to use a snap switch for three-circuit switching in place of the rotary switch.

Accordingly, it should be understood that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What we claim is:

1. A digital adding device for the base *n* comprising:

a carry input terminal;

a carry relay comprising a single armature, $n+1$ contactors controlled by said armature and a magnetic coil connected to said carry input terminal, said carry relay performing on-off operations in accordance with the existence or non-existence respectively of a carry signal appearing on said carry input terminal;

*n* input terminals, corresponding to digits from 0 to $n-1$;

$n+1$ auxiliary terminals, corresponding to digits from 0 to $n-1$ and to a carry digit;

said input terminals being connected to said auxiliary terminals by said contactors such that when the carry relay is in the off position the *n* input terminals are connected to the *n* auxiliary terminals which correspond to the digits from 0 to $n-1$, and when the carry relay is in the on position the *n* input terminals are connected to the *n* auxiliary terminals which correspond to the digits from 1 to $n-1$ and to the carry digit;

a carry output terminal;

an $n+1$ pole, *n* throw, manually operated electrical switch, said $n+1$ poles corresponding to digits from 0 to $n-1$ and to a carry digit, and said *n* throws corresponding to digits from 0 to $n-1$;

said poles corresponding to digits from 0 to $n-1$ being connected to the *n* auxiliary terminals corresponding to digits from 0 to $n-1$;

said pole corresponding to the carry digit being connected to said carry output terminal;

said auxiliary terminal corresponding to the carry digit being connected to said pole of said switch corresponding to the 0 digit;

said auxiliary terminals corresponding to the digits from 1 to $n-1$ and to the carry digit being connected to said pole of said switch corresponding to the carry digit at said throws corresponding to digits from $n-1$ to 0 respectively;

$n$ output terminals, corresponding to digits from 0 to $n-1$ connected to said poles at said throws of said switch such that a signal appearing on a given one of said $n$ input terminals and representing the digit in correspondence with said input terminal is transmitted to that one of said $n$ output terminals which corresponds to the sum of the digit represented by said signal and the digit corresponding to the throw of said switch.

2. A digital subtracting device for the base $n$ comprising:

a borrow input terminal;

a borrow relay comprising a single armature, $n+1$ contactors controlled by said armature and a magnetic coil connected to said borrow input terminal, said borrow relay performing on-off operations in accordance with the existence or non-existence respectively of a borrow signal appearing on said borrow input terminal;

$n$ input terminals, corresponding to digits from 0 to $n-1$;

$n+1$ auxiliary terminals, corresponding to digits from 0 to $n-1$ and to a borrow digit;

said input terminals being connected to said auxiliary terminals by said contactors such that when the borrow relay is in the off position the $n$ input terminals are connected to the $n$ auxiliary terminals which correspond to the digits from 0 to $n-1$, and when the borrow relay is in the on position the $n$ input terminals are connected to the $n$ auxiliary terminals which correspond to the borrow digit and to the digits from 0 to $n-2$;

a borrow output terminal;

an $n+1$ pole, $n$ throw, manually operated electrical switch, said $n+1$ poles corresponding to digits from 0 to $n-1$ and to a borrow digit, and said $n$ throws corresponding to digits from 0 to $n-1$;

said poles corresponding to digits from 0 to $n-1$ being connected to the $n$ auxiliary terminals corresponding to digits from 0 to $n-1$;

said pole corresponding to the borrow digit being connected to said borrow output terminal;

said auxiliary terminal corresponding to the borrow digit being connected to said pole of said switch corresponding to the 9 digit;

said auxiliary terminals corresponding to the borrow digit and to the digits from 0 to $n-2$ being connected to said pole of said switch corresponding to the carry digit at said throws corresponding to digits from 0 to $n-1$ respectively;

$n$ output terminals, corresponding to digits from 0 to $n-1$ connected to said poles at said throws of said switch such that a signal appearing on a given one of said $n$ input terminals and representing the digit in correspondence with said input terminal is transmitted to that one of said $n$ output terminals which corresponds to the difference between the digit represented by said signal and the digit corresponding to the throw of said switch.

References Cited

UNITED STATES PATENTS 2,699,290 1/1955 Hoppe ------------- 235—173

FOREIGN PATENTS 652,997 11/1962 Canada.

MALCOLM A. MORRISON, *Primary Examiner.*

K. R. MILDE, *Assistant Examiner.*